United States Patent
Ashdown

Patent Number: 5,834,765
Date of Patent: Nov. 10, 1998

[54] INTEGRAL AMBIENT LIGHT AND OCCUPANCY SENSOR HAVING A LINEAR ARRAY OF SENSOR ELEMENT AND A SEGMENTED SLIT APERTURE DEVICE

[75] Inventor: Ian E. Ashdown, West Vancouver, Canada

[73] Assignee: Ledalite Architectural Products, Inc., Langley, Canada

[21] Appl. No.: 889,789

[22] Filed: Jul. 8, 1997

[51] Int. Cl.$^6$ .................................................. G01V 9/04
[52] U.S. Cl. .................................. 250/221; 250/214 AL; 250/214.1
[58] Field of Search ........................... 250/221, 214 AL, 250/214.1, 578.1, 206.1, 206.2, 203.1

[56] References Cited

U.S. PATENT DOCUMENTS

| | | | |
|---|---|---|---|
| 4,277,727 | 7/1981 | LeVert | 315/155 |
| 4,460,892 | 7/1984 | Bailey, Jr. | 340/555 |
| 4,554,460 | 11/1985 | Klein | 250/578 |
| 4,874,937 | 10/1989 | Okamoto | 250/206.2 |
| 4,902,886 | 2/1990 | Smisko | 250/214 R |
| 4,906,832 | 3/1990 | Beeckel | 250/208.4 |
| 4,914,283 | 4/1990 | Brinckmann et al. | 250/206.01 |
| 5,036,187 | 7/1991 | Yoshida et al. | 250/214 B |
| 5,073,706 | 12/1991 | Kulju | 250/221 |
| 5,107,103 | 4/1992 | Gruss et al. | 250/208.3 |
| 5,245,176 | 9/1993 | Haugen | 250/208.3 |
| 5,303,027 | 4/1994 | Kuderer et al. | 356/328 |
| 5,539,198 | 7/1996 | McMichael et al. | 250/221 |

Primary Examiner—Que Le
Attorney, Agent, or Firm—Stoell Rives LLP

[57] ABSTRACT

A sensor implemented with a single light sensing device detects ambient light levels and object motion. The sensor comprises an optical component assembly composed of a linear array of light sensitive elements, preferably photodiodes, positioned downstream of a segmented slit aperture device comprising a single, segmented slit, the slit length of which is oriented perpendicular to the length of the linear array. The individual photodiodes of the array provide motion detection capability in a direction perpendicular to the slit length. The slit aperture is segmented along the slit length to form multiple zones of sensor light responsivity that provide motion detection capability in a direction parallel to the slit length. An object moving in a direction parallel to the multiple slit aperture passes through one or more zones of sensor responsivity and thereby produces from the photodiodes a varying electrical signal from which object motion can be detected. A processor in a first mode detects an ambient light level and in a second mode detects object motion. In the first mode, the processor determines the average amount of light received by the entire photodiode array by computing an average of light signal data values derived from the photodiodes in response to the quantities of light they receive during an exposure time. In the second mode, the processor compares light signal data values acquired at different times for corresponding photodiodes to detect differences in light intensities of adjacent zones of sensor responsivity to detect object motion. The processor is capable of concurrently performing the first and second modes.

17 Claims, 2 Drawing Sheets

INTEGRAL AMBIENT LIGHT AND OCCUPANCY SENSOR HAVING A LINEAR ARRAY OF SENSOR ELEMENT AND A SEGMENTED SLIT APERTURE DEVICE

TECHNICAL FIELD

The present invention relates to ambient light and motion detection systems and, more particularly, to an integrated sensor device that incorporates ambient light sensing and occupancy sensing capabilities.

BACKGROUND OF THE INVENTION

Architectural lighting systems may be controlled by electronic systems that activate the luminaires into an on or off condition depending on the presence of occupants in the room and by systems that adjust the luminaire light levels depending on the amount of present ambient light, which may include both natural and artificial light.

Systems that activate the luminaires into the on or off condition depending on the presence of occupants in the room typically require an occupancy sensor to detect the presence of a person or persons within the room. The two most commonly used types of occupancy sensors are passive infrared detectors and ultrasonic transceivers.

Passive infrared detectors are sensitive to warm objects such as human bodies that radiate most of their thermal energy in the far region of the infrared spectrum between 6 to 10 microns. The detector is sensitive to sudden changes in the amount of the far infrared light it receives and produces a small electrical voltage as its temperature changes by a few thousandths of a degree. Once thermal equilibrium is reached the detector no longer produces any electrical signal. By using an array of lenses, the sensitivity of the detector is divided into several zones. A person moving across the field of view of the detector will cross one or more of these zones, so that the change in amount of received thermal energy as the person moves from zone to zone will produce a changing electrical voltage that can be detected.

One disadvantage of this type of sensor is that a person must be moving in order to be reliably detected. If an occupant sits or stands relatively motionless for a few minutes, a passive infrared occupancy sensor is unable to detect the presence of the occupant and may turn the luminaires off if there is nobody else in the room. Another disadvantage of this type of sensor is that the plastic Fresnel lens arrays typically used are relatively large, typically at least 15 mm in diameter. This is so because the only common plastic material that is transparent in the far infrared region is polyethylene. Polyethylene is a relatively soft plastic, which makes it difficult to mold small-scale features onto its surface. Yet another disadvantage of this type of sensor is that images formed by the array of lenses overlap and thereby reduce the contrast of individual images. Consequently, the separation of the sensor field of view into zones is not complete.

Other disadvantages of such a sensor include the fact that it is very sensitive to thermal drafts and other sudden changes in ambient air temperature, acoustic disturbances, and radio frequency interference. Thus, false triggering of the luminaires may occur by placing the sensor too close to an air vent in a room, by mechanical vibrations and loud sounds, or by transient RFI signals produced by power electronics used in architectural lighting systems controls. Furthermore, passive infrared detectors have an effective range of approximately twenty feet (six meters) when used in architectural occupancy sensors. This is so because, for distances greater than twenty feet, the amount of thermal energy radiated by a human body is insufficient to be reliably detected against the background thermal radiation from other surfaces in the room.

The other most common type of occupancy sensor is an ultrasonic transceiver. Ultrasonic transceivers consist of an ultrasonic transmitter that emits bursts of high-frequency sound, and an ultrasonic receiver that listens for the echoes from nearby surfaces. If a person or other object moves between these bursts, the intensity and duration of the echoes will change.

A disadvantage of ultrasonic transceivers is that multiple ultrasonic transceivers within a room can interfere with each other's operation. This is so because there is no easy means of distinguishing the echoes from a transmitted ultrasonic burst from those bursts emitted by other units. Ultrasonic detectors may also inadvertently detect movement outside of their intended field of view within a room because of ultrasonic echoes from multiple reflections within a room and adjoining spaces, such as hallways. Another problem with ultrasonic detectors is that large and bulky receiver horns are necessary to limit the field of view to specific angles.

Given these limitations, some occupancy sensor manufacturers have recently resorted to using complex and relatively expensive digital signal processors that are programmed to analyze the received train of ultrasonic echoes and filter out background noise. They and other manufacturers also offer combination occupancy sensors that include both passive infrared detectors and ultrasonic transceivers. These devices produce an output, typically a low voltage signal or an electromechanical relay closure, only if both sensors detect movement within their respective fields of view.

Systems that adjust the luminaire light levels depending on the amount of present ambient light require a light sensor to monitor the ambient light present in the room. There are two types of commonly used ambient light sensors.

One type of ambient light sensor is a light-dependent resistor. This type of sensor is constructed from a thin film of cadmium sulfide or similar material whose electrical resistance varies in relation to the amount of light incident on it. The spectral sensitivity of a light-dependent resistor closely matches that of the human visual system. Light-dependent resistors are most often used as daylight sensors in outdoor motion detectors to ensure that security luminaires are not activated during daylight hours.

Another type of ambient light sensor is a silicon photodiode. Silicon photodiodes are silicon-based semiconductors that produce a small electric current when exposed to light. By themselves, silicon photodiodes are more sensitive to near infrared light (0.9 micron) than they are to visible light (0.4 to 0.7 micron). However, suitable glass or plastic filters can be used to filter the incident light and produce sensors whose spectral sensitivity more closely matches that of the human visual system. These filters are typically mounted directly on the sensor housing by the sensor manufacturer.

A disadvantage of both light-dependent resistors and silicon photodiode sensors is that they produce analog output signals, whereas most sophisticated monitoring and control systems for architectural lighting are based on digital computer control. In these cases, an analog-to-digital converter is required to convert the analog output signals from the ambient light sensors into equivalent digital signals.

Video surveillance cameras may also be used for sophisticated occupancy detection applications. Individual video frames can be captured by a computer and quickly analyzed for changes from previously captured images. However, these cameras require a considerable quantity of electronics hardware to produce digital images from the analog video signal. A considerable amount of computer processing power and memory is needed to analyze the captured video frames.

While most video sensors are designed as rectangular arrays of photodiode light sensors, some applications require linear arrays. Examples include industrial machine vision systems, bar code scanners, document scanners, and optical character recognition systems. The primary disadvantage of linear photodiode arrays is that they provide an image consisting of a single line when used with one or more spherical lenses. This is appropriate for their intended applications, where objects are mechanically scanned past the field of view of the sensor. It is not appropriate for occupancy sensors, however, where a wide-angle field of view in two dimensions is typically required.

SUMMARY OF THE INVENTION

An object of this invention to provide an integral ambient light and occupancy sensor that is based on a single light sensing device and capable of concurrent ambient light and object motion detection.

Another object of the invention is to provide such a sensor that requires a relatively small sensor housing.

A further object of the invention is to provide such a sensor that is insensitive to electrical and acoustic interference from architectural lighting systems.

The present invention is a sensor implemented with a single light sensing device to detect ambient light levels and object motion. The sensor comprises an optical component assembly composed of a linear array of light sensitive elements, preferably photodiodes, positioned downstream of a segmented slit aperture device comprising a single, segmented slit, the slit length of which is oriented perpendicular to the length of the linear array. The individual photodiodes of the array provide motion detection capability in a direction perpendicular to the slit length. The slit aperture is segmented along the slit length to form multiple zones of sensor light responsivity that provide motion detection capability in a direction parallel to the slit length. An object moving in a direction parallel to the multiple slit aperture passes through one or more zones of sensor responsivity and thereby produces from the photodiodes a varying electrical signal from which object motion can be detected.

A processor is operable in a first mode to detect an ambient light level and in a second mode to detect object motion. In the first mode, the processor determines the average amount of light received by the entire photodiode array by computing an average of light signal data values derived from the photodiodes in response to the quantities of light they receive during an exposure time. In the second mode, the processor compares light signal data values acquired at different times for corresponding photodiodes to detect differences in light intensities of adjacent zones of sensor responsivity to detect object motion. The processor is capable of concurrently performing the first and second modes.

An optional visible light filter positioned upstream of the multiple slit aperture matches the spectral response of the linear array of photodiodes to approximately that of the human visual system.

Additional objects and advantages of this invention will be apparent from the following detailed description of preferred embodiments thereof which proceeds with reference to the accompanying drawings.

DETAILED DESCRIPTION OF PREFERRED EMBODIMENTS

Figure 1:
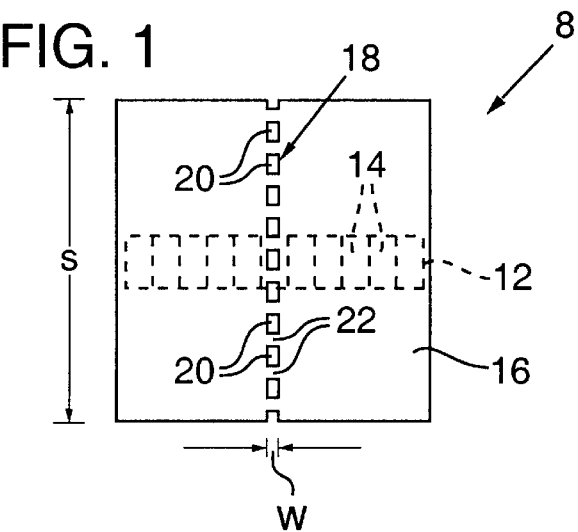
FIG. 1 is a front elevation view of the optical components of a preferred integral ambient light and occupancy sensor of the present invention.
Figure 2:
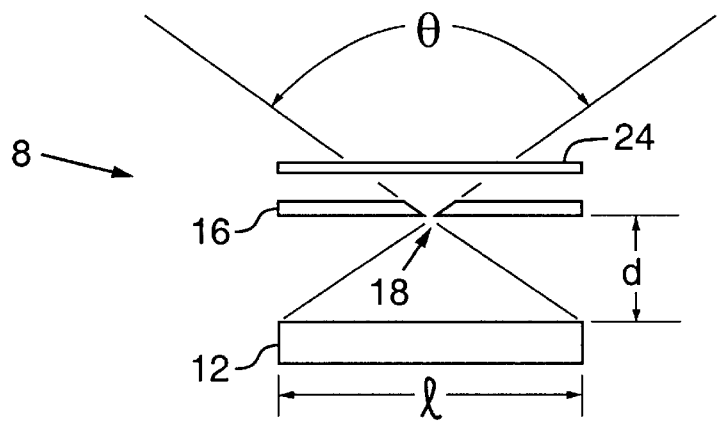
FIG. 2 is a diagram of a top view of the sensor optical components of FIG. 1.
Figure 3:
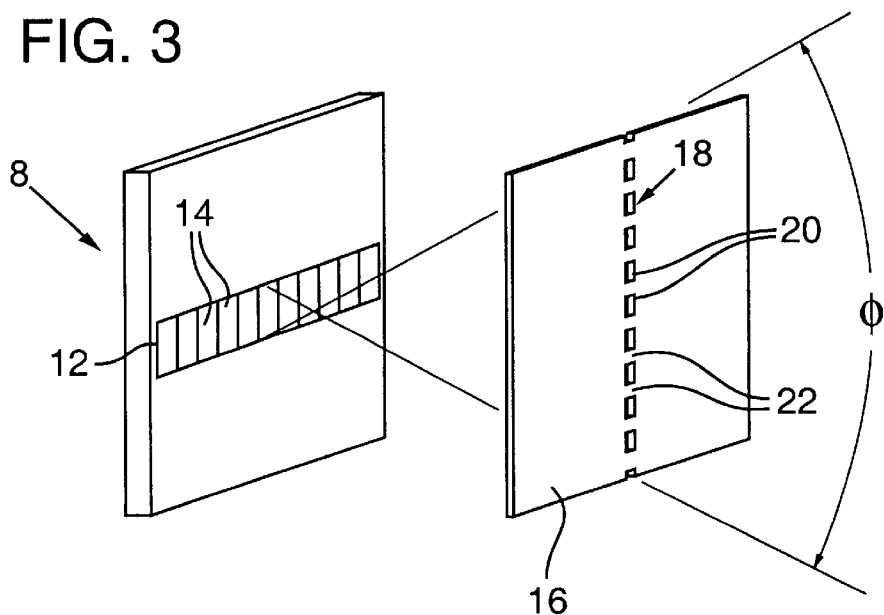
FIG. 3 is an isometric view of the sensor optical components of FIG. 1.

FIGS. 1–3 show an optical component assembly 8 of a preferred integral ambient light and occupancy sensor 10 (FIG. 4) that can be incorporated into architectural lighting systems for controlling luminaires depending on the amount of ambient light and/or the presence of a person or persons in a room. With reference to FIGS. 1–3, optical component assembly 8 is composed of a linear array 12 of light sensitive elements 14, preferably photodiode sensors, located downstream of a segmented slit aperture device 16 that has a segmented slit aperture 18 extending along its length, s. Photodiode array 12 and segmented slit aperture device 16 are separated a distance, d, apart by a spacer (not shown). Segmented slit aperture 18 is formed by an alternate sequence of first and second areas 20 and 22 of different light transmissivities aligned in a direction perpendicular to photodiode array 12. Segmented slit aperture 18 cooperates with photodiode array 12 to divide photodiode array 12 into multiple zones of sensor light responsivity. The size, location, and degree of light transmissivity of the zones of light responsivity of photodiode array 12 are determined by the size, location, and degree of light transmissivity of the corresponding areas 20 and 22 of segmented slit aperture 18. The reason for dividing the slit aperture into segments relates to its function as an occupancy detector, which is described below.

Slit aperture device 18 can be formed on an optically transparent substrate, such as glass, covered by a thin metal foil with portions removed by laser processing to form an alternate sequence of optically transparent areas 20 and light reflecting areas 22. An alternative technique would be an evaporated metal layer on a glass substrate. Both of these implementations provide light transmission through areas 20 and light blockage by areas 22, the latter causing zones of zero sensor responsivity for photodiode array 12. To eliminate zones of zero sensor responsivity, segmented slit aperture device 16 can be implemented as photographic film exposed to have regions of different gray shades that form areas 22 of different light transmissivity. Thus, areas 20 and 22 would not block all light incident to them but pass to photodiode array 12 light of different intensities that the individual photodiodes 14 could detect.

An optional visible light filter 24 (shown only in FIG. 2), such as a conventional blue tinted filter, may be provided either upstream or downstream of slit aperture device 16 to match approximately the spectral response of photodiode array 12 with that of the human eye.

As seen in FIGS. 1 and 2, photodiode array 12 receives radiation, such as visible light, propagating through segmented slit aperture 18. Photodiode array 12 has an angular field of view θ in a direction perpendicular to segmented slit aperture 18. The field of view θ is determined by the length, l, of photodiode array 12 and distance d between segmented slit aperture 18 and photodiode array 12. Length 1 of photodiode array 12 is determined by the manufacturer. A Model TSL 1401 manufactured by Texas Instruments, Inc., Dallas, Tex., would be a suitable linear photodiode array, having a length l of about ¼ inch (6.35 mm). The distance d is preferably about ¼ inch (6.35 mm). The field of view θ is expressed by the formula:

$$\theta = 2 \times \arctan(l/d).$$

Since length l of photodiode array 12 is fixed, field of view θ can be adjusted by changing the distance d so that increasing and decreasing the distance d respectively decreases and increases the field of view θ. A distance d of about ¼ inch (6.35 mm) and length l of about ¼ inch (6.35 mm) gives a preferred field of view θ of about 90°.

As seen in FIG. 3, photodiode array 12 has an angular field of view φ in a direction parallel to segmented slit aperture 18. The field of view φ is determined by length s of segmented slit aperture 18 (FIG. 2) and distance d between photodiode array 12 and segmented slit aperture 18 as expressed by the formula:

$$\phi = 2 \times \arctan(s/d).$$

The length s is set at ¼ inch (6.35 mm) to provide a preferred field of view φ of about 90° when distance d is about ¼ inch (6.35 mm).

The width, w, of segmented slit aperture 18 (FIG. 2) determines for any given photodiode 14 in photodiode array 12 the angular width of the field of view in the direction parallel to photodiode array 12. Ideally, the total field of view for any given photodiode 14 will not overlap the fields of view of adjacent photodiodes 14. For instance, on the one hand, if segmented slit aperture 18 is too wide, the fields of view of adjacent photodiodes 14 will overlap. On the other hand, if segmented slit aperture 18 is too narrow, diffraction effects will distribute rays of light to two or more adjacent photodiodes 14. In either case, the ability of sensor 10 (FIG. 4) to distinguish movement through changes in the amount of light received by each photodiode 14 would be compromised. A preferred slit width w is 1/50 inch (0.5 mm) for use with a TSL 1401 photodiode array 12, but a 1/10 inch (2.5 mm) slit width is feasible with lower resolution performance.

Without the presence of the alternate sequence of first and second areas 20 and 22, sensor 10 would be capable of detecting movement only in the direction parallel to photodiode array 12. For use as an occupancy sensor, however, it is desirable to detect movement perpendicular and parallel to the slit aperture. Segmented slit aperture 18 accomplishes this result because the field of view of each photodiode 14 is periodically interrupted in the direction parallel to segmented slit aperture 18. This has the effect of creating zones of sensor responsivity of a type similar to those created by Fresnel lenses and passive infrared sensors. A person or an object moving in a direction parallel to segmented slit aperture 18 will pass through one or more zones of sensor light responsivity established by the alternating sequence of areas 20 and 22 and thereby produce a varying electrical signal from an individual photodiode 14 that can be used to detect the movement.

As was stated above, implementing segmented slit aperture by providing an image of a slit aperture having different regions of gray shades in a sheet of exposed photographic film divides the light responsivity of each photodiode 14 into zones of light responsivity without creating undesirable areas of zero light responsivity. A linear photodiode array 12 having 128 photodiodes 14 (i.e., pixels) would preferably be divided by segmented slit aperture device 16 to have about 15 light reflecting areas 22 or 15 areas darker in gray scale than the darknesses of areas 20.

Figure 4:
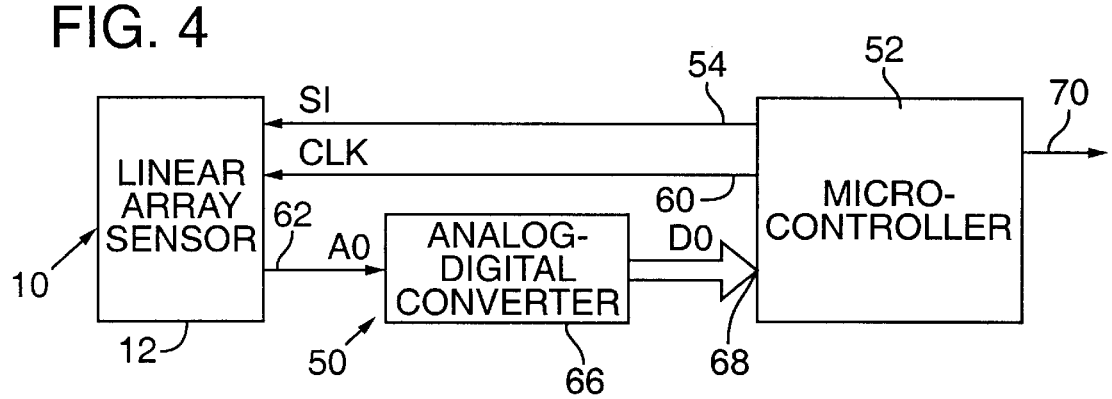
FIG. 4 is a block diagram of electrical circuitry that controls the operation of the sensor of the present invention.
Figure 5:
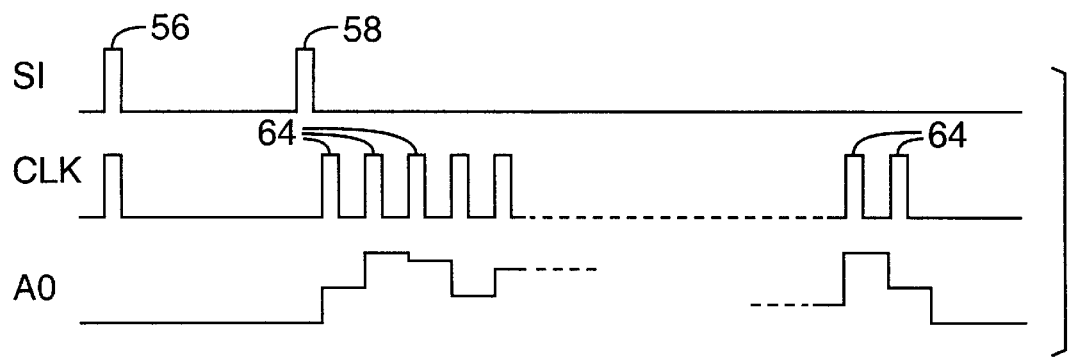
FIG. 5 is a timing diagram of signals developed by the electrical circuitry shown in FIG. 4.

FIG. 4 is a block diagram of, and FIG. 5 is a timing diagram of signals developed by, electrical circuitry 50 that controls the operation of sensor 10. With reference to FIGS. 4 and 5, a microcontroller 52 is in data and control signal communication with photodiode array 12 to measure the amount of ambient light incident to and the existence of object motion within the overall angular field of view of photodiode array 12. Microcontroller 52 provides at an output 54 time-displaced start integration (SI) pulses 56 and 58 to which photodiode array 12 responds by measuring light incident to photodiodes 14 during an exposure period set by SI pulses 56 and 58. The time delay between the leading edges of SI pulses 56 and 58 determines the exposure duration.

A burst clock signal (CLK) develops at an output 60 of microcontroller 52 a series of 128 signal pulses 62 (for a linear array 12 of 128 photodiodes 14) that are applied to photodiode array 12. Signal pulses 62 cause serial readout at an output 64 of photodiode array 12 an analog signal A0 of changing amplitude representing the quantities of light measured by photodiodes 14 during the exposure period. Analog signal A0 is applied to an analog-to-digital converter 66, which provides light data values at its data output (D0). The light data values are applied as parallel-bit digital words to an input port 68 of microcontroller 52. A typical resolution of analog-to-digital converter 66 would be no greater than 8 bits.

Microcontroller 52 has instructions stored in memory to process in one of two modes the light data values representing the light measured by photodiodes 14. A preferred microcontroller 52 includes a Model PIC 16C73 microprocessor with a built-in analog-to-digital converter, manufactured by Microchip Technology, Inc., Chandler, Ariz.

In a first mode, microcontroller 52 computes an average of the light data values representing the quantities of light measured during the exposure period to determine the average of the amount of light incident to photodiode array 12. Microcontroller 52 provides on an output 70, in response to the amount of light measured, a signal that can be used, for example, to control the light intensity level of a luminaire assembly. In the first mode sensor 10 functions, therefore, as an ambient light sensor.

There are performance options for the first mode that stem from a choice of exposure time duration. Microcontroller 52 can optionally adjust the exposure time and repeat the measurement process to ensure that the majority of photodiodes 14 are neither underexposed (thereby producing a minimum analog output voltage) nor saturated (thereby producing a maximum analog output voltage). Microcontroller 52 measures the analog output voltage of each photodiode 14 as an independent value, which can be selectively processed and stored or ignored as required, depending on the particular application. Microcontroller 52 can, therefore, be programmed to selectively ignore specific portions of the overall field of view of photodiode array 12.

Figure 6:
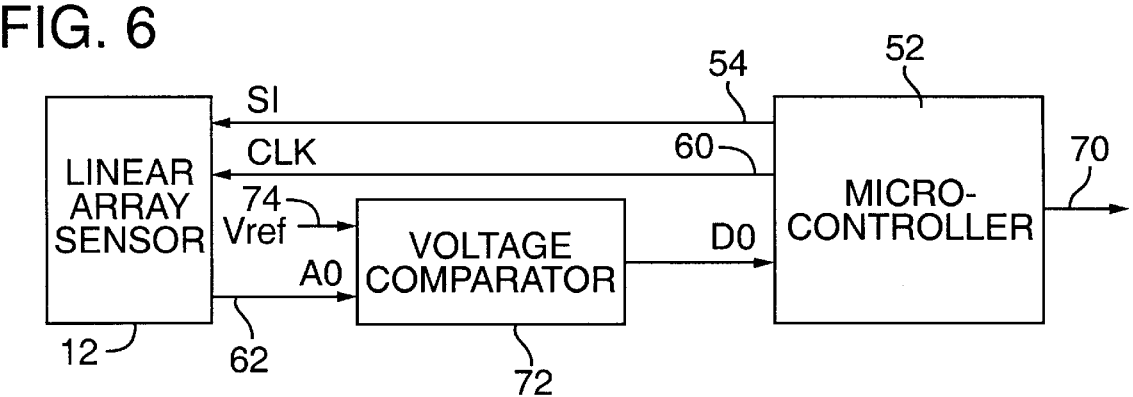
FIG. 6 is a block diagram of electrical circuitry in which a voltage comparator is substituted for the analog-digital-converter implemented in the electrical circuitry of FIG. 4.

FIG. 6 shows an embodiment in which a voltage comparator 72 is substituted for analog-to-digital converter 66 to determine the analog voltage for each photodiode 14. With reference to FIG. 6, a single conductor digital output of comparator 72 indicates whether the analog voltage signal A0 appearing at output 64 of photodiode array 12 is above or below a threshold established by a reference voltage, $V_{ref}$, connected to an input 74 of comparator 72. Multiple measurements are performed using different exposure times. Under conditions in which the light incident to photodiode array 12 does not significantly vary between measurements, the analog voltage for each photodiode 14 can be determined to within a high degree of accuracy by recording the two closest exposure times at which the corresponding analog voltage is below and above the reference voltage threshold $V_{ref}$. The performance of voltage comparator 72 may be enhanced by the use of multiple voltage comparators, each of which is connected to a different reference voltage. The multiplicity of measurements performed by using different exposure times can then be correspondingly reduced by performing a multiplicity of voltage comparisons in parallel.

In a second mode, microcontroller 52 compares light data values of individual photodiodes 14 with light data values representing previous measurements taken. The detection of differences in light intensities of adjacent zones of light responsivity along segmented slit aperture 18 at different times detects object motion within the overall field of view of photodiode array 12. Skilled persons will appreciate that various known signal processing algorithms could be used to distinguish valid movement of objects from insignificant background movements and random electrical noise. Microcontroller 52 provides on output 70, in response to detection of object motion, a signal that can be used to, for example, activate an alarm or actuate a luminaire assembly.

The process of the second mode can be performed concurrently with the process of determining the average amount of light received by photodiode array 12 (or selected portions of it) of the first mode during each exposure period.

It will be obvious to those having skill in the art that many changes may be made to the details of the above-described embodiments of this invention without departing from the underlying principles thereof. For example, the invention can be implemented to be responsive to light outside the visible spectrum. The scope of the present invention should, therefore, be determined only by the following claims.

I claim:

1. An integral ambient light and occupancy sensor having an overall angular field of view, comprising:
    a linear array of light sensitive elements, the array having an array length and the light sensitive elements producing light signals representing quantities of light incident on them;
    a segmented slit aperture device having a slit aperture defined by a slit length and a slit width that is much smaller than the array length, the slit aperture device positioned a distance away from the linear array and oriented so that the slit length crosses the linear array in a transverse direction, the distance between the linear array and the slit aperture device contributing to the overall angular field of view of the sensor, and the slit aperture being segmented along the slit length to form multiple zones of light responsivity for the linear array along the slit length; and
    a processor operatively connected to the linear array to process light data values corresponding to the light signals, the processor operable in first and second modes, in the first mode the processor determining from the light data values a quantity representing an average measure of the light incident on the linear array, and in the second mode the processor determining from light data values acquired at different times for corresponding light sensitive elements to detect the existence of object motion within the overall angular field of view of the sensor.

2. The sensor of claim 1, further comprising a visible light filter having a spectral response approximating that of the human visual system and positioned in optical association with the linear array to cause the linear array to have a spectral response approximating that of the human visual system.

3. The sensor of claim 2 in which the visible light filter is positioned either upstream or downstream of the segmented slit aperture device to intercept incident light before it propagates to the linear array.

4. The sensor of claim 1 in which the segmented slit aperture device comprises a substrate having alternate areas of different light transmissivity along the slit length to form the zones of light responsivity.

5. The sensor of claim 4 in which the substrate comprises exposed photographic film having different gray shades forming the areas of different light transmissivity.

6. The sensor of claim 1 in which the slit width determines for any one of the light sensitive elements a width of an angular field of view in a direction parallel to the linear array, the slit width being set so that the angular fields of view of adjacent light sensitive elements do not overlap appreciably and do not by diffraction effects distribute appreciable amounts of incident light to adjacent light sensitive elements.

7. The sensor of claim 1 in which the light sensitive elements comprise photodiodes.

8. The sensor of claim 1 in which the light data values correspond to light signals developed during an exposure time and in which, in the first mode, the processor computes an average of the light data values corresponding to light signals developed during the exposure time to determine the average measure of the light incident on the linear array.

9. The sensor of claim 1 in which, in the second mode, the processor compares the light data values for corresponding light sensitive elements at different times to detect differences in light intensities of adjacent zones of light responsivity along the slit length to determine the existence of object motion.

10. The sensor of claim 1 in which the processor performs the first and second modes concurrently.

11. An integral ambient light and occupancy sensor optical component assembly having an overall angular field of view, comprising:
    a linear array of light sensitive elements, the array having an array length and the light sensitive elements producing light signals representing quantities of light incident on them; and
    a segmented slit aperture device having a slit aperture defined by a slit length and a slit width that is much smaller than the array length, the slit aperture device positioned a distance away from the linear array and oriented so that the slit length crosses the linear array in a transverse direction, the distance between the linear array and the slit aperture device contributing to the overall angular field of view of the sensor optical component assembly, and the slit aperture being segmented along the slit length to form multiple zones of light responsivity for the linear array along the slit length.

12. The optical component assembly of claim 11, further comprising a visible light filter having a spectral response approximating that of the human visual system and positioned in optical association with the linear array to cause the linear array to have a spectral response approximating that of the human visual system.

13. The optical component assembly of claim 12 in which the visible light filter is positioned either upstream or downstream of the segmented slit aperture device to intercept incident light before it propagates to the linear array.

14. The optical component assembly of claim 11 in which the segmented slit aperture device comprises a substrate having alternate areas of different light transmissivity along the slit length to form the zones of light responsivity.

15. The optical component assembly of claim 14 in which the substrate comprises exposed photographic film having different gray shades forming the areas of different light transmissivity.

16. The optical component assembly of claim 11 in which the slit width determines for any one of the light sensitive elements a width of an angular field of view in a direction parallel to the linear array, the slit width being set so that the angular fields of view of adjacent light sensitive elements do not overlap appreciably and do not by diffraction effects distribute appreciable amounts of incident light to adjacent light sensitive elements.

17. The optical component assembly of claim 11 in which the light sensitive elements comprise photodiodes.

* * * * *